(12) United States Patent
Wang et al.

(10) Patent No.: US 9,850,830 B2
(45) Date of Patent: Dec. 26, 2017

(54) ENERGY BALANCE BASED BOOST CONTROL USING FEEDBACK LINEARIZATION

(71) Applicant: GM GLOBAL TECHNOLOGY OPERATIONS LLC, Detroit, MI (US)

(72) Inventors: Yue-Yun Wang, Troy, MI (US); Ibrahim Haskara, Macomb, MI (US); Vincenzo Alfieri, Turin (IT); Giuseppe Conte, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 398 days.

(21) Appl. No.: 14/562,820

(22) Filed: Dec. 8, 2014

(65) Prior Publication Data

US 2016/0160771 A1 Jun. 9, 2016

(51) Int. Cl.
| | | |
|---|---|---|
| *F02D 41/00* | (2006.01) | |
| *F02B 33/40* | (2006.01) | |
| *F02B 37/12* | (2006.01) | |
| *F02D 41/18* | (2006.01) | |
| *F02D 41/14* | (2006.01) | |

(52) U.S. Cl.
CPC .......... *F02D 41/0007* (2013.01); *F02B 33/40* (2013.01); *F02B 37/12* (2013.01); *F02D 41/1401* (2013.01); *F02D 41/1446* (2013.01); *F02D 41/18* (2013.01); *F02D 2041/141* (2013.01); *F02D 2041/1419* (2013.01); *F02D 2200/0402* (2013.01); *F02D 2200/0406* (2013.01); *F02D 2200/0414* (2013.01); *F02D 2200/703* (2013.01); *Y02T 10/144* (2013.01)

(58) Field of Classification Search
CPC ......... F02D 41/0007; F02D 2200/0402; F02D 2200/0414; F02D 2200/0406; F02D 2200/703; F02D 41/1401; F02D 2041/1419; F02D 41/1446; F02D 2041/141; F02D 41/18; F02B 37/12; F02B 33/40
USPC .............................................. 60/605.1, 605.2
See application file for complete search history.

(56) References Cited

U.S. PATENT DOCUMENTS

| | | | |
|---|---|---|---|
| 8,640,679 B2* | 2/2014 | Wang | F02D 41/0007 123/568.21 |
| 2003/0149522 A1* | 8/2003 | Arnold | F01D 17/14 701/100 |
| 2011/0088390 A1* | 4/2011 | Panciroli | F02D 41/0007 60/602 |

(Continued)

*Primary Examiner* — Mark Laurenzi
*Assistant Examiner* — Wesley Harris

(57) ABSTRACT

An internal combustion engine includes an air charging system with a boost air system. A method to control the boost air in the air charging system, decoupled from the air and EGR system controls, includes monitoring a reference boost pressure and operating parameters of the air charging system; creating a turbocharger energy balance model of the air charging system; applying feedback linearization control to the turbocharger energy balance model to create an approximately linearized feedback system; and determining a boost control command for the air charging system using the approximately linearized feedback system based on the monitored reference boost pressure and the monitored operating parameters of the air charging system. The boost air in the air charging system is controlled based upon the boost control command.

20 Claims, 6 Drawing Sheets

(56) References Cited

U.S. PATENT DOCUMENTS

2012/0173118 A1 7/2012 Wang
2013/0327039 A1* 12/2013 Schenker .............. F02B 37/004
60/602

* cited by examiner

ENERGY BALANCE BASED BOOST CONTROL USING FEEDBACK LINEARIZATION

TECHNICAL FIELD

This disclosure is related to control of internal combustion engines.

BACKGROUND

The statements in this section merely provide background information related to the present disclosure. Accordingly, such statements are not intended to constitute an admission of prior art.

Engine control includes control of parameters in the operation of an engine based upon a desired engine output, including an engine speed and an engine load, and resulting operation, for example, including engine emissions. Parameters controlled by engine control methods include air flow, fuel flow, and intake and exhaust valve settings.

Boost air can be provided to an engine to provide an increased flow of air to the engine relative to a naturally aspirated intake system to increase the output of the engine. A turbocharger utilizes pressure in an exhaust system of the engine to drive a compressor providing boost air to the engine. Exemplary turbochargers can include variable geometry turbochargers (VGT), enabling modulation of boost air provided for given conditions in the exhaust system. A supercharger utilizes mechanical power from the engine, for example as provided by an accessory belt, to drive a compressor providing boost air to the engine. Engine control methods control boost air in order to control the resulting combustion within the engine and the resulting output of the engine.

Exhaust gas recirculation (EGR) is another parameter that can be controlled by engine controls. An exhaust gas flow within the exhaust system of an engine is depleted of oxygen and is essentially an inert gas. When introduced to or retained within a combustion chamber in combination with a combustion charge of fuel and air, the exhaust gas moderates the combustion, reducing an output and an adiabatic flame temperature. EGR can also be controlled in combination with other parameters in advanced combustion strategies, for example, including homogeneous charge compression ignition (HCCI) combustion. EGR can also be controlled to change properties of the resulting exhaust gas flow. Engine control methods control EGR in order to control the resulting combustion within the engine and the resulting output of the engine.

Air handling systems for an engine manage the flow of intake air and EGR into the engine. Air handling systems must be equipped to meet charge air composition targets (e.g. an EGR fraction target) to achieve emissions targets, and meet total air available targets (e.g. the charge flow mass flow) to achieve desired power and torque targets. The actuators that most strongly affect EGR flow generally affect charge flow, and the actuators that most strongly affect charge flow generally affect EGR flow. Therefore, an engine with a modern air handling system presents a multiple input multiple output (MIMO) system with coupled input-output response loops.

MIMO systems, where the inputs are coupled, i.e. the input-output response loops affect each other, present well known challenges in the art. An engine air handling system presents further challenges. The engine operates over a wide range of parameters including variable engine speeds, variable torque outputs, and variable fueling and timing schedules. In many cases, exact transfer functions for the system are unavailable and/or the computing power needed for a standard decoupling calculation is not available.

SUMMARY

An internal combustion engine includes an air charging system with a boost air system. A method to control the boost air in the air charging system, decoupled from the air and EGR system controls, includes monitoring a reference boost pressure and operating parameters of the air charging system; creating a turbocharger energy balance model of the air charging system; applying feedback linearization control to the turbocharger energy balance model to create an approximately linearized feedback system; and determining a boost control command for the air charging system using the approximately linearized feedback system based on the monitored reference boost pressure and the monitored operating parameters of the air charging system. The boost air in the air charging system is controlled based upon the boost control command.

BRIEF DESCRIPTION OF THE DRAWINGS

One or more embodiments will now be described, by way of example, with reference to the accompanying drawings, in which:

FIG. 5-1 graphically depicts engine test results during load transients, including a comparison of boost pressure and time at an engine speed of 1500 rpm;

FIG. 5-2 graphically depicts engine test results during load transients, including a comparison of boost pressure and time at an engine speed of 1750 rpm;

FIG. 5-3 graphically depicts engine test results during load transients, including a comparison of boost pressure and time at an engine speed of 2000 rpm;

FIG. 5-4 graphically depicts engine test results during load transients, including a comparison of boost pressure and time at an engine speed of 2500 rpm;

DETAILED DESCRIPTION

Figure 1:
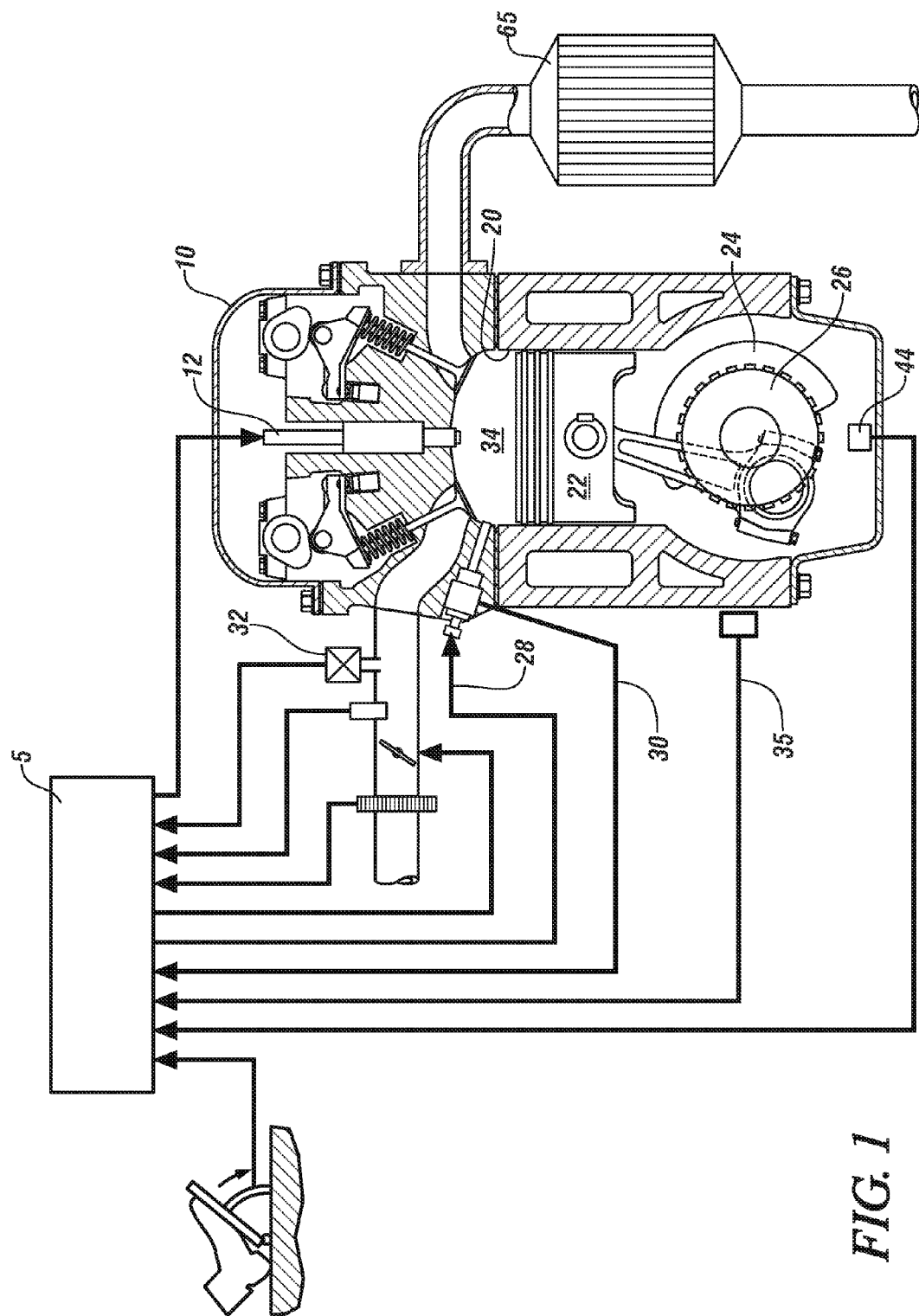
FIG. 1 schematically depicts an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 schematically depicts an exemplary internal combustion engine 10, control module 5, and exhaust aftertreatment system 65, in accordance with the present disclosure. The exemplary engine includes a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request, $T_{O\_REQ}$. The engine preferably employs a four-stroke operation wherein each engine combustion cycle includes 720 degrees of angular rotation of crankshaft 24 divided into four 180-degree stages (intake-compression-expansion-exhaust), which are descriptive of reciprocating movement of the piston 22 in the engine cylinder 20. A multi-tooth target wheel 26 is attached to the crankshaft and rotates therewith. The engine includes sensors to monitor engine operation, and actuators which control engine operation. The sensors and actuators are signally or operatively connected to control module 5.

The engine is preferably a direct-injection, four-stroke, internal combustion engine including a variable volume combustion chamber defined by the piston reciprocating within the cylinder between top-dead-center and bottom-dead-center points and a cylinder head including an intake valve and an exhaust valve. The piston reciprocates in repetitive cycles each cycle including intake, compression, expansion, and exhaust strokes.

The engine preferably has an air/fuel operating regime that is primarily lean of stoichiometry. One having ordinary skill in the art understands that aspects of the disclosure are applicable to other engine configurations that operate either at stoichiometry or primarily lean of stoichiometry, e.g., lean-burn spark-ignition engines or the conventional gasoline engines. During normal operation of the compression-ignition engine, a combustion event occurs during each engine cycle when a fuel charge is injected into the combustion chamber to form, with the intake air, the cylinder charge. The charge is subsequently combusted by action of compression thereof during the compression stroke.

The engine is adapted to operate over a broad range of temperatures, cylinder charge (air, fuel, and EGR) and injection events. The methods disclosed herein are particularly suited to operation with direct-injection compression-ignition engines operating lean of stoichiometry to determine parameters which correlate to heat release in each of the combustion chambers during ongoing operation. The methods are further applicable to other engine configurations, including spark-ignition engines, including those adapted to use homogeneous charge compression ignition (HCCI) strategies. The methods are applicable to systems utilizing multi-pulse fuel injection events per cylinder per engine cycle, e.g., a system employing a pilot injection for fuel reforming, a main injection event for engine power, and where applicable, a post-combustion fuel injection event for aftertreatment management, each which affects cylinder pressure.

Sensors are installed on or near the engine to monitor physical characteristics and generate signals which are correlatable to engine and ambient parameters. The sensors include a crankshaft rotation sensor, including a crank sensor 44 for monitoring crankshaft (i.e. engine) speed (RPM) through sensing edges on the teeth of the multi-tooth target wheel 26. The crank sensor is known, and may include, e.g., a Hall-effect sensor, an inductive sensor, or a magnetoresistive sensor. Signal output from the crank sensor 44 is input to the control module 5. A combustion pressure sensor 30 is adapted to monitor in-cylinder pressure (COMB_PR). The combustion pressure sensor 30 is preferably non-intrusive and includes a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the pressure sensor 30. The output signal, COMB_PR, of the pressure sensor 30 is proportional to cylinder pressure. The pressure sensor 30 includes a piezoceramic or other device adaptable as such. Other sensors preferably include a manifold pressure sensor for monitoring manifold pressure (MAP) and ambient barometric pressure (BARO), a mass air flow sensor for monitoring intake mass air flow (MAF) and intake air temperature ($T_{IN}$), and a coolant sensor 35 monitoring engine coolant temperature (COOLANT). The system may include an exhaust gas sensor for monitoring states of one or more exhaust gas parameters, e.g., temperature, air/fuel ratio, and constituents. One skilled in the art understands that there may be other sensors and methods for purposes of control and diagnostics. The operator input, in the form of the operator torque request, $T_{O\_REQ}$, is typically obtained through a throttle pedal and a brake pedal, among other devices. The engine is preferably equipped with other sensors for monitoring operation and for purposes of system control. Each of the sensors is signally connected to the control module 5 to provide signal information which is transformed by the control module to information representative of the respective monitored parameter. It is understood that this configuration is illustrative, not restrictive, including the various sensors being replaceable with functionally equivalent devices and routines.

The actuators are installed on the engine and controlled by the control module 5 in response to operator inputs to achieve various performance goals. Actuators include an electronically-controlled throttle valve which controls throttle opening in response to a control signal (ETC), and a plurality of fuel injectors 12 for directly injecting fuel into each of the combustion chambers in response to a control signal (INJ_PW), all of which are controlled in response to the operator torque request, $T_{O\_REQ}$. An exhaust gas recirculation valve 32 and cooler control flow of externally recirculated exhaust gas to the engine intake, in response to a control signal (EGR) from the control module. A glow-plug 28 is installed in each of the combustion chambers and adapted for use with the combustion pressure sensor 30. Additionally, a charging system can be employed in some embodiments supplying boost air according to a desired manifold air pressure.

Fuel injector 12 is a high-pressure fuel injector adapted to directly inject a fuel charge into one of the combustion chambers in response to the command signal, INJ_PW, from the control module. Each of the fuel injectors 12 is supplied pressurized fuel from a fuel distribution system, and has operating characteristics including a minimum pulsewidth and an associated minimum controllable fuel flow rate, and a maximum fuel flow rate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 executes routines stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift on systems so equipped. The control module is configured to receive input signals from the operator (e.g., a throttle pedal position and a brake pedal position) to determine the operator torque request, $T_{O\_REQ}$, and from the sensors indicating the engine speed (RPM) and intake air temperature (Tin), and coolant temperature and other ambient conditions.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the desired functionality. The control module has a set of control routines, including resident software program instructions and calibrations stored in memory and executed to provide the desired functions. The routines are preferably executed during preset loop cycles. Routines are executed, such as by a central processing unit, and are operable to monitor inputs from sensors and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

FIG. 1 depicts an exemplary diesel engine, however, the present disclosure can be utilized on other engine configurations, for example, including gasoline-fueled engines, ethanol or E85 fueled engines, or other similar known designs. The disclosure is not intended to be limited to the particular exemplary embodiments disclosed herein.

Figure 2:
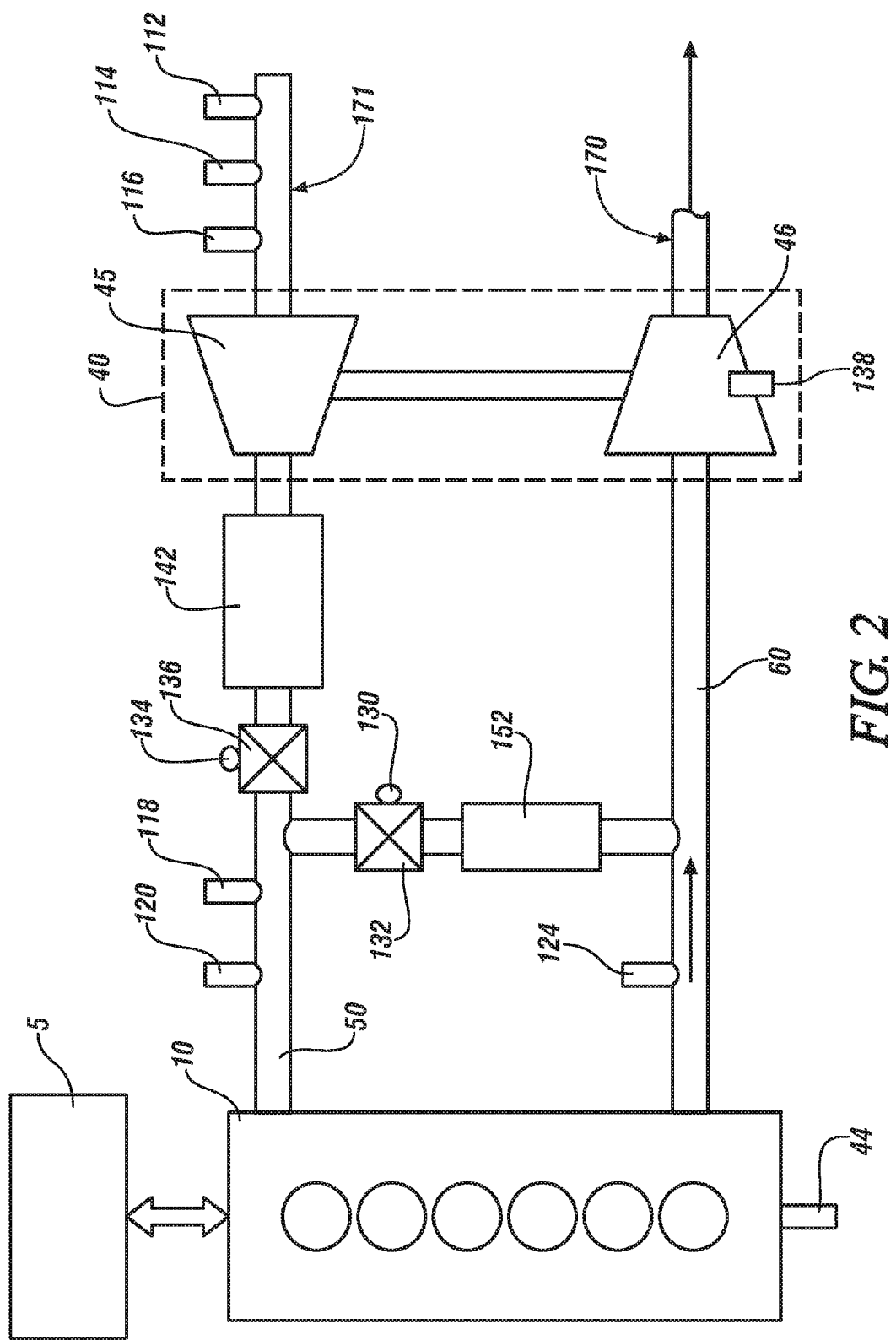
FIG. 2 schematically depicts an exemplary engine configuration including a turbocharger, an accordance with the present disclosure.

FIG. 2 schematically depicts an exemplary engine configuration including a turbocharger, in accordance with the present disclosure. The exemplary engine is multi-cylinder and includes a variety of fueling types and combustion strategies known in the art. Engine system components include an intake air compressor 40 including a turbine 46 and an air compressor 45, an air throttle valve 136, a charge air cooler 142, an EGR valve 132 and cooler 152, an intake manifold 50, and exhaust manifold 60. Ambient intake air is drawn into compressor 45 through intake 171. Pressurized intake air and EGR flow are delivered to intake manifold 50 for use in engine 10. Exhaust gas flow exits engine 10 through exhaust manifold 60, drives turbine 46, and exits through exhaust tube 170. The depicted EGR system is a high pressure EGR system, delivering pressurized exhaust gas from exhaust manifold 60 to intake manifold 50. An alternative configuration, a low pressure EGR system, can deliver low pressure exhaust gas from after exhaust tube 170 to intake 171. Sensors are installed on the engine to monitor physical characteristics and generate signals which are correlatable to engine and ambient parameters. The sensors preferably include an ambient air pressure sensor 112, an ambient or intake air temperature sensor 114, and a mass air flow sensor 116 (all which can be configured individually or as a single integrated device), an intake manifold air temperature sensor 118, an MAP sensor 120, or similarly, a boost pressure sensor can be installed upstream of the intake air throttle, an exhaust gas temperature sensor 124, an air throttle valve position sensor 134 and an EGR valve position sensor 130, and a turbine vane position sensor 138. Engine speed sensor 44 monitors rotational speed of the engine. Each of the sensors is signally connected to the control module 5 to provide signal information which is transformed by the control module 5 to information representative of the respective monitored parameter. It is understood that this configuration is illustrative, not restrictive, including the various sensors being replaceable within functionally equivalent devices and routines and still fall within the scope of the disclosure. Furthermore, the intake air compressor 40 may include alternative turbocharger configurations within the scope of this disclosure.

The intake air compressor 40 includes a turbocharger including an air compressor 45 positioned in the air intake of the engine which is driven by turbine 46 that is positioned in the exhaust gas flowstream. Turbine 46 can include a number of embodiments, including a device with fixed vane orientations or variable vane orientations. Further, a turbocharger can be used as a single device, or multiple turbochargers can be used to supply boost air to the same engine.

Variable geometry turbochargers (VGT) enable control of how much compression is performed on intake air. A control signal can modulate operation of the VGT, for example, by modulating an angle of the vanes in the compressor and/or turbine. Such exemplary modulation can decrease the angle of such vanes, decreasing compression of the intake air, or increase the angle of such vanes, increasing compression of the intake air. VGT systems allow a control module to select a level of boost pressure delivered to the engine. Other methods of controlling a variable charger output, for example, including a waste gate or a bypass valve, can be implemented similarly to a VGT system, and the disclosure is not intended to be limited to the particular exemplary embodiments disclosed herein for controlling boost pressure delivered to the engine.

Exemplary diesel engines are equipped with common rail fuel-injection systems, EGR systems, and VGT systems. Exhaust gas recirculation is used to controllably decrease combustion flaming temperature and reduce NOx emissions. VGT systems are utilized to modulate boost pressures to control a manifold air pressure and increase engine output. To accomplish engine control including control of the EGR and VGT systems, a multi-input multi-output air charging control module (MIMO module) can be utilized. A MIMO module enables computationally efficient and coordinated control of EGR and VGT based upon a single set of inputs describing desired engine operation. Such input, for example, can include an operating point for the engine describing an engine speed and an engine load. It will be appreciated that other parameters can be utilized as input, for example, including pressure measurements indicating an engine load.

Coupled MIMO control of both EGR and VGT, or control fixing response of both EGR and VGT based upon any given input, is computationally efficient and can enable complex control responses to changing inputs that might not be computationally possible in real-time based upon independent control of EGR and VGT. However, coupled control of EGR and VGT, including fixed responses of both parameters for any given input, requires simplified or best fit calibrations of the coupled controls in order to control both fixed responses. As a result, such calibrations can be challenging and can include less than optimal engine performance based upon the simplified control calibrations selected. EGR and VGT, for example, might optimally react differently to a rate of change in load or to engine temperatures. Additionally, control of EGR or VGT can reach limit conditions and result in actuator saturation. Coupled control resulting in actuator saturation can cause a condition known in the art as wind-up wherein expected behavior of the system and desired control of the system diverge and result in control errors even after the actuator saturation has been resolved. Additionally, control of EGR and VGT by a MIMO module is nonlinear, and defining the coupled functional relationships to provide the desired control outputs requires extensive calibration work.

VGT commands are one way to control boost pressure. However, other commands controlling a boost pressure such as a boost pressure command or a manifold air pressure command can be utilized similarly in place of VGT commands.

The engine configuration, such as the exemplary engine configuration, including a turbocharger, as is schematically depicted in FIG. 2 may be represented by a mathematical model. Model-based boost control algorithms using physics-based energy balance relation of a turbocharger may be used to decouple the design of boost or turbocharger control from air and EGR system controls. By using the physics-based turbocharger energy balance model with feedback linearization or feedforward control architectures a nonlinear control problem may be transformed into an approximately linearized feedback system. This decoupled boost control may reduce vehicle calibration work for altitude and extreme ambient operating conditions. The decoupled control simplifies design work, and model based control design can be calibrated at dyno test cell, which works for varying operating conditions with reduced vehicle calibrations.

A physics-based energy balance relation of a turbocharger, with respect to the exemplary engine configuration depicted in FIG. 2, can be expressed by the following relationship.

$$\dot{p}_{rc} = -c^* h_c r_c(p_{rc}, Q_c) + c^* h_t r_t \quad [1]$$

The physics-based energy balance relation of a turbocharger may alternatively be expressed to include the turbo inertia, the inertia effect of the turbo shaft connecting the turbine to the compressor, by the following relationship.

$$\dot{p}_{rc} = -c^* h_c r_c(p_{rc}, Q_c) + c^* h_t r_t + J(\dot{Q}_c, Q_c) \quad [2]$$

It will be appreciated that the physics-based energy balance relations of a turbocharger expressed by relationships [1] and [2] are equivalent apart from the consideration of turbo inertia, wherein:

$p_{rc}$ is the compressor pressure ratio, c is a constant determined based on the relationship between the compressor pressure ratio and the square of the turbo speed, $h_c$ is fresh air energy flow into the compressor and can be expressed by the following relationship:

$$h_c = \dot{m}_a c_{pa} T_a \quad [3]$$

wherein $m_a$ is the air mass at the intake, $c_{pa}$ is the specific heat at constant pressure at the compressor inlet, $T_a$ is the compressor inlet temperature, $r_c$ is the compressor power increase rate and can be expressed by the following relationship:

$$r_c = \frac{P_c}{h_c} \quad [4]$$

wherein $P_c$ is the compressor power, $Q_c$ is the corrected compressor flow and can be expressed by the following relationship:

$$Q_c = \frac{\dot{m}_a \sqrt{T_a}}{p_a} \quad [5]$$

wherein $p_a$ is the ambient pressure at the compressor inlet, $h_t$ is exhaust energy flow into the turbine and can be expressed by the following relationship:

$$h_t = \dot{m}_t c_{pe} T_{ex} \quad [6]$$

wherein $\dot{m}_t$ is the exhaust mass flow through turbine, $c_{pe}$ is the specific heat at constant pressure on the exhaust side, $T_{ex}$ is the exhaust temperature, $r_t$ is the turbine power transfer rate and can be expressed by the following relationship:

$$r_t = \frac{P_t}{h_t} \quad [7]$$

wherein $P_t$ is the turbine power, and $J(\dot{Q}_c, Q_c)$ is the turbo inertia effect.

Feedback linearization control may be used to transform a nonlinear boost control problem into an approximately linearized feedback system. Feedback linearization control with respect to the physics-based energy balance relations of a turbocharger expressed by relationships [1] and [2] may be expressed by the following relationship:

$$r_t = \frac{1}{h_t}\left(h_c r_c(p_{rc}, Q_c) - \frac{1}{c}J(\dot{Q}_c, Q_c) + \frac{1}{c}v\right) \quad [8]$$

wherein v is a feedback control signal.

With this feedback linearization control, the model from v to $p_{rc}$ may be expressed by the following expression:

$$\dot{p}_{rc} \approx v \quad [9]$$

Figure 3:
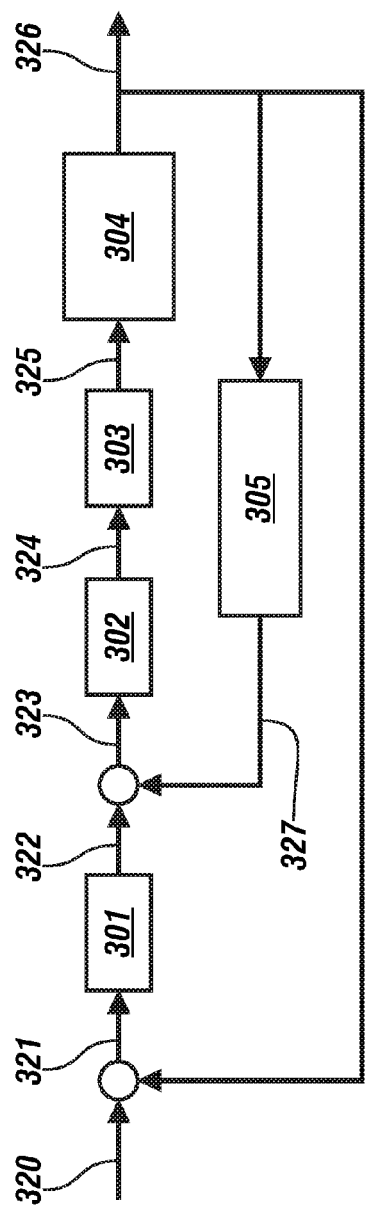
FIG. 3 schematically depicts an exemplary boost control system using a physics-based energy balance relation of a turbocharger, with state feedback linearization control and inner and outer loop feedback, in accordance with the present disclosure.

FIG. 3 schematically depicts an exemplary boost control system using a physics-based energy balance relation of a turbocharger, with state feedback linearization control and inner and outer loop feedback, in accordance with the present disclosure. Air charging system 304 receives commands and produces outputs. A number of modules and control strategies are depicted developing the commands, including feedback control module 301 and feedback linearization module 305. A reference boost pressure signal 320, indicating a desired boost pressure, is compared with an actual boost pressure feedback signal 326 which is determined by direct sensor measurements or may alternatively be estimated by a state variable observer module based on monitored operating parameters of the air charging system 304 if no sensor is present. This feedback loop comprises the outer loop of the exemplary boost control system. The comparison of the reference boost pressure signal 320 with the actual boost pressure feedback signal 326 determines a boost pressure error term 321. The boost pressure error term 321 is input into the feedback control module 301. A feedback control method is implemented by feedback control module 301 to determine feedback control signal v 322. Actual boost pressure feedback signal 326 is additionally input into feedback linearization module 305 in the inner feedback loop of the exemplary boost control system. The feedback linearization module 305 may additionally input monitored or estimated parameters of the air charging system 304. The feedback linearization module 305 determines a feedback linearization control signal 327 based on monitored parameters of the air charging system 304, the actual boost pressure feedback signal 326. The feedback linearization control signal 327 may be expressed by the following term of the feedback linearization control relationship of equation [8]:

$$h_c r_c(p_{rc}, Q_c) + J(\dot{Q}_c, Q_c) \quad [10]$$

Feedback control signal v 322 is then added to feedback linearization control signal 327 to determine a turbine power signal 323. Turbine power signal 323 is input into module 302 which divides turbine power signal 327 by the exhaust energy flow into the turbine $h_t$ in order to determine turbine power transfer rate $r_t$ 324. Turbine power transfer rate 324 is then transformed into a VGT command $u_{VGT}$ 325 by module 303. The transformation of the turbine power transfer rate 324 into the VGT command 325 may be achieved through the use of an inverse flow model or an inverse of a physical model of a boost control system. An exemplary inverse physical model of a boost control system may be expressed by the following relationship:

$$u_{VGT} = f\left(r_t, \frac{\dot{m}_t}{p_{to}}\sqrt{T_{ex}}\right) \quad [11]$$

wherein function f(*,*) can be a look-up table or polynomial The VGT command 325 is then used to control an actuator in the turbocharger, thus controlling the boost pressure in the air charging system 304.

An inverse flow model or an inverse of a physical model of a system can be useful in determining settings required to achieve a desired flow through an orifice in the system. Flow through a system can be modeled as a function of a pressure difference across the system and a flow restriction in the system. Known or determinable terms can be substituted and the functional relationship manipulated to make an inverse flow model of the system useful to determine a desired system setting to achieve a desired flow. Exemplary methods disclosed herein utilize a first input of an effective flow area or of a flow restriction for the system being modeled, and a second input including a pressure value for the system of pressure moving the flow through the system. An exemplary method of decoupled feed forward control of a charging system, such as a turbocharger equipped with a VGT, can utilize an inverse of the physical model of the system, a dimensional table approach, or an exponential polyfit model.

These methods can be utilized individually or in combination, and different methods can be utilized for the same system for different conditions and operating ranges. A control method can utilize an inverse flow model to determine a feed forward control command for a first selection including the charging system. The control method can additionally utilize a second inverse flow model to determine a second feed forward control command for a second selection including one of an EGR circuit, and an air throttle system. The control method can additionally utilize a third inverse flow model to determine a third feed forward control command for a third selection including another of the EGR circuit, and the air throttle system. In this way, a control method can control any or all of the EGR circuit, the air throttle system, and the charging system.

Feedback control module 301 of the exemplary boost control system of FIG. 3 determines feedback control command 322 using feedback control methods. The exemplary feedback control methods used by the feedback control module can include a proportional-integral-derivative (PID) control method and input boost pressure error term 321. The feedback control module 301 may alternatively include model predictive control (MPC), or linear quadratic regulator (LQR) feedback control methods with minimum gains scheduling required.

Figure 4:
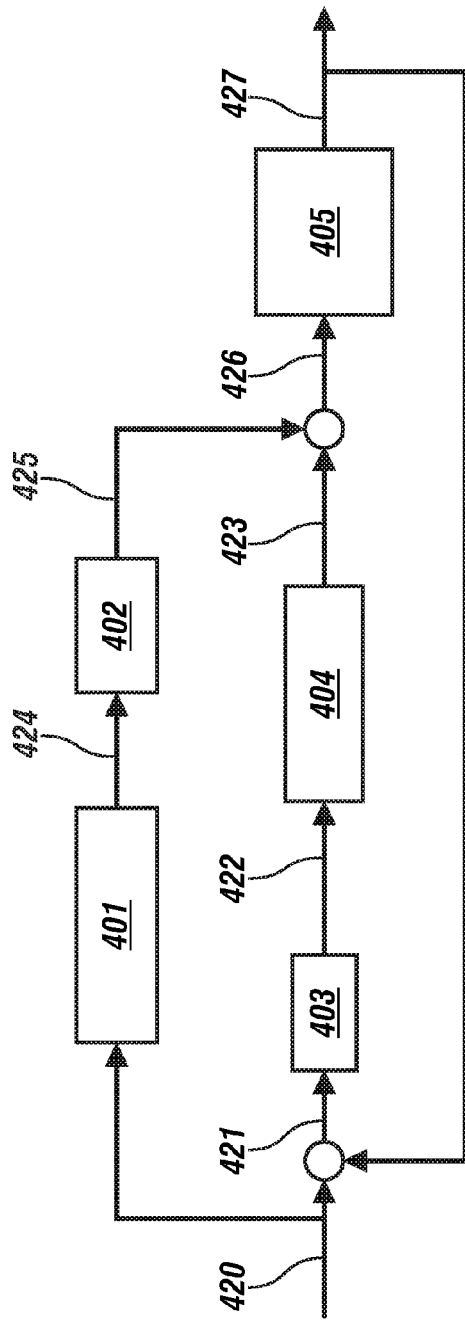
FIG. 4 schematically depicts an exemplary boost control system using a physics-based energy balance relation of a turbocharger, with feedforward control and feedback control, in accordance with the present disclosure.

FIG. 4 schematically depicts an exemplary boost control system using a physics-based energy balance relation of a turbocharger, with feedforward control and feedback control, in accordance with the present disclosure. Air charging system 405 receives commands and produces outputs. A number of modules and control strategies are depicted developing the commands, including feedback control module 404 and feedforward module 401. A reference boost pressure signal 420, indicating a desired boost pressure, is compared with an actual boost pressure feedback signal 427 which may be determined by direct sensor measurements or may alternatively be estimated by a state variable observer module based on monitored operating parameters of the air charging system 405 if no sensor is present. The comparison of the reference boost pressure signal 420 with the actual boost pressure feedback signal 427 determines a boost pressure error term 421. The boost pressure error term 421 is input into module 403 which divides the boost pressure error term 421 by the exhaust energy flow into the turbine $h_t$ and the ambient pressure $p_a$ to determine feedback error term 422. Feedback error term 422 is input into the feedback control module 404. A feedback control method is implemented by feedback control module 404 to determine feedback control signal v 423. Reference boost pressure signal 420 is additionally input into feedforward control module 401. The feedforward control module 401 may additionally input monitored or estimated parameters of the air charging system 405. The feedforward control module 401 determines a feedforward signal 424 based on monitored parameters of the air charging system 405, and the reference boost pressure signal 420. The feedforward signal 424 may be expressed by the following term of the feedback linearization control relationship of equation [8].

$$\frac{1}{h_t}\left(h_c r_c(p_{rc}, Q_c) - \frac{1}{c}J(\dot{Q}_c, Q_c)\right) \quad [12]$$

Feedforward signal 424 is then transformed into feedforward control signal 425 by module 402. The transformation of the turbine power transfer rate 424 into the VGT command 425 may be achieved with the method of using an inverse flow model or an inverse of a physical model of a system to determine settings required to achieve a desired flow through an orifice in the system, as was discussed with reference to FIG. 3. Feedback control signal v 423 is then added to feedforward control signal 425 to determine a VGT command $u_{VGT}$ 426. The VGT command 426 is then used to control an actuator in the turbocharger, thus controlling the boost pressure in the air charging system 405.

The exemplary feedback control methods used by the feedback control module 404 can include a proportional-integral-derivative (PID) control method and input feedback error term 422. The feedback control module 404 may alternatively include model predictive control (MPC), or linear quadratic regulator (LQR) feedback control methods with minimum gains scheduling required.

Figures 1, 5:
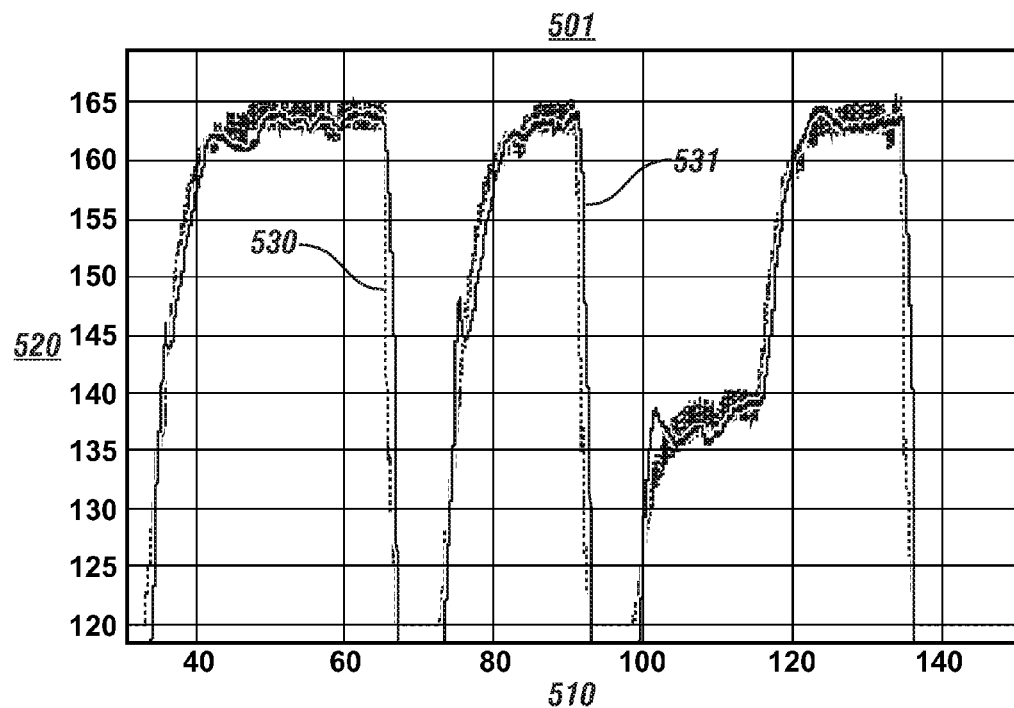
Figures 2, 5:
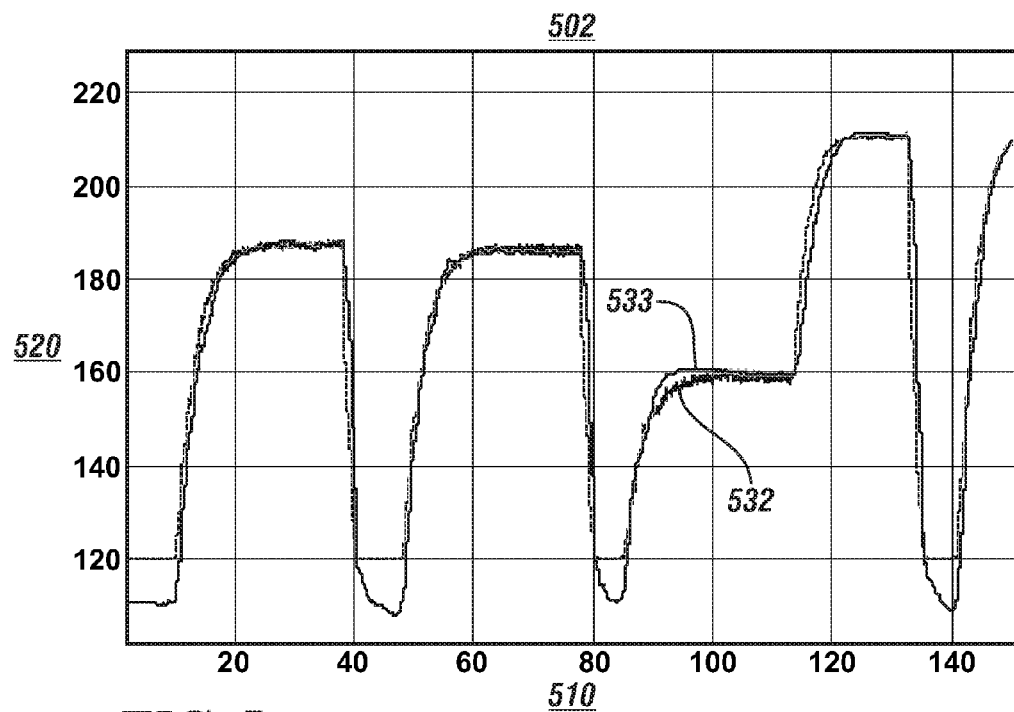
Figures 3, 5:
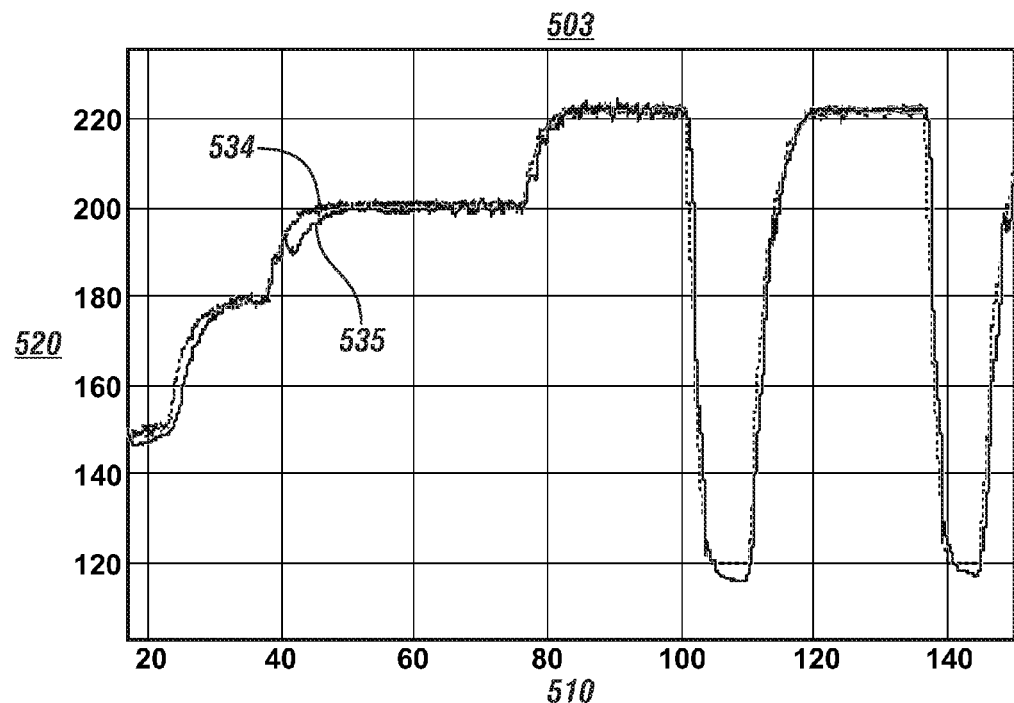
Figures 4, 5:
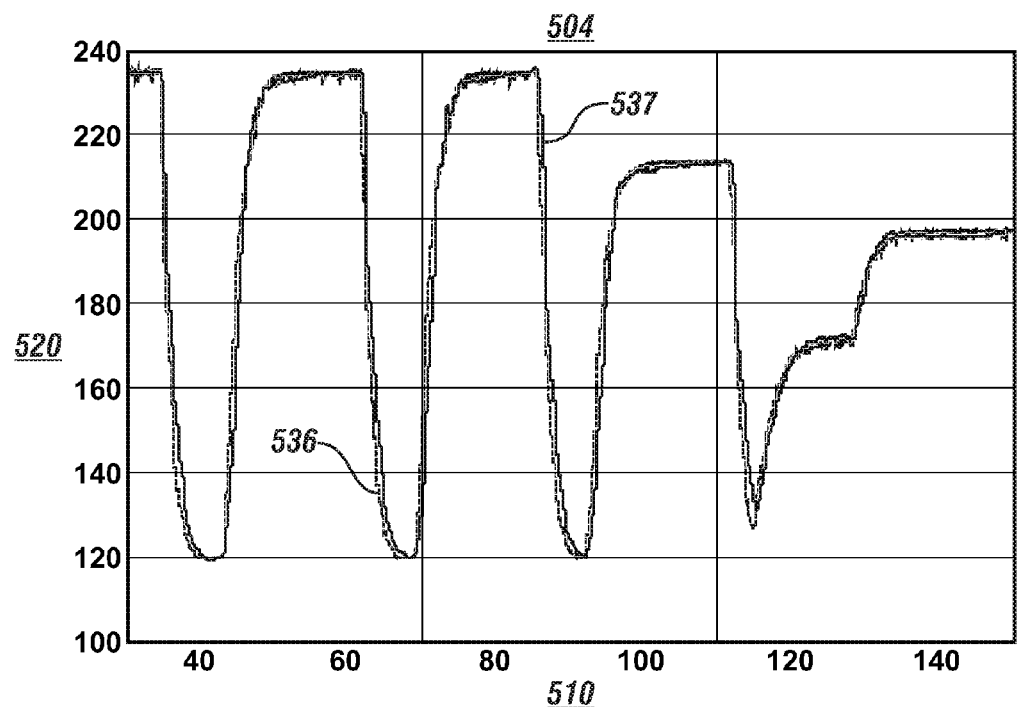

FIG. 5-1 graphically depicts engine test results during load transients (fuel 0~60 mg/injection), including a comparison of boost pressure 520 and time 510 at an engine speed of 1500 rpm 501. Actual boost pressure 531 tracks commanded boost pressure 530 throughout the depicted load transients.

FIG. 5-2 graphically depicts engine test results during load transients (fuel 0~60 mg/injection), including a comparison of boost pressure 520 and time 510 at an engine speed of 1750 rpm 502. Actual boost pressure 533 tracks commanded boost pressure 532 throughout the depicted load transients.

FIG. 5-3 graphically depicts engine test results during load transients (fuel 0~60 mg/injection), including a comparison of boost pressure 520 and time 510 at an engine speed of 2000 rpm 503. Actual boost pressure 535 tracks commanded boost pressure 534 throughout the depicted load transients.

FIG. 5-4 graphically depicts engine test results during load transients (fuel 0~60 mg/injection), including a comparison of boost pressure 520 and time 510 at an engine speed of 2500 rpm 504. Actual boost pressure 537 tracks commanded boost pressure 536 throughout the depicted load transients.

Figure 6:
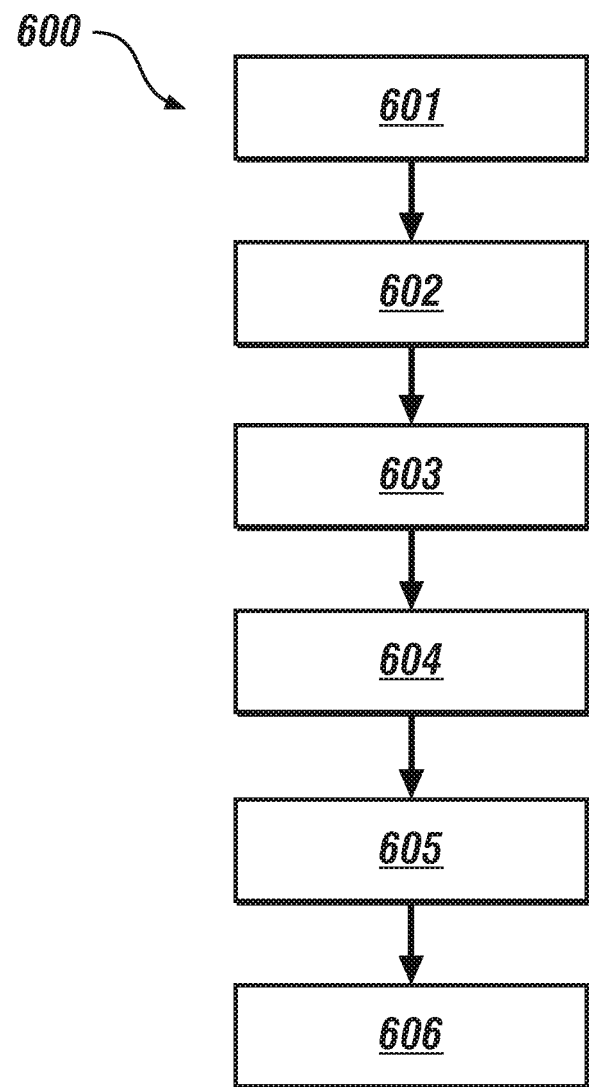
FIG. 6 depicts an exemplary process, in accordance with the present disclosure.

FIG. 6 depicts an exemplary process 600 of energy balance based boost control of an air charging system of an internal combustion engine using feedback linearization, in accordance with the present disclosure. Table 1 is provided as a key wherein the numerically labeled blocks and the corresponding functions are set forth as follows.

TABLE 1

| BLOCK | BLOCK CONTENTS |
|---|---|
| 601 | Monitor a reference boost pressure, indicating a desired boost pressure |
| 602 | Monitor operating parameters of an air charging system |
| 603 | Create a turbocharger energy balance model of the air charging system |
| 604 | Applying feedback linearization control of the turbocharger energy balance model of the air charging system to produce an approximately linearized feedback system |
| 605 | Determine a boost control command for the air charging system using the approximately linearized feedback system based on the monitored reference boost pressure and the monitored operating parameters of the air charging system |
| 606 | Control the boost air in the air charging system based on the boost control command |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control boost air in an air charging system in an internal combustion engine, the method comprising:
monitoring a reference boost pressure;
monitoring operating parameters of the air charging system;
providing a turbocharger energy balance model of the air charging system;
applying feedback linearization control to the turbocharger energy balance model to create an approximately linearized feedback system;
determining a boost control command for the air charging system using the approximately linearized feedback system based on the monitored reference boost pressure and the monitored operating parameters of the air charging system;
controlling the boost air in the air charging system based upon the boost control command.

2. The method of claim 1, wherein the reference boost pressure comprises a desired boost pressure.

3. The method of claim 1, wherein the operating parameters of the air charging system comprise an actual boost pressure.

4. The method of claim 1, wherein the operating parameters of the air charging system comprise fresh mass air flow, fuel flow, intake manifold pressure, intake manifold temperature, ambient pressure, ambient temperature, and engine exhaust temperature.

5. The method of claim 1, wherein said turbocharger energy balance model of the air charging system is expressed by the following relationship:

$$\dot{P}_{rc} = -c^* h_c r_c (P_{rc} Q_c) + c^* h_t r_t$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine, and
$r_t$ is a turbine power transfer rate.

6. The method of claim 1, wherein said turbocharger energy balance model of the air charging system is expressed by the following relationship:

$$\dot{P}_{rc} = -c^* h_c r_c (P_{rc} Q_c) + c^* h_t r_t + J(\dot{Q}_c, Q_c)$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine,
$r_t$ is a turbine power transfer rate, and
$J(\dot{Q}_c, Q_c)$ is a turbo inertia effect.

7. The method of claim 1, wherein feedback linearization control to the turbocharger energy balance model to create an approximately linearized feedback system is expressed by the following relationship:

$$r_t = \frac{1}{h_t}\left(h_c r_c (p_{rc}, Q_c) - \frac{1}{c} J(\dot{Q}_c, Q_c) + \frac{1}{c} v\right)$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine,
$r_t$ is a turbine power transfer rate, v is a feedback control signal based on a feedback control method, and $J(\dot{Q}_c, Q_c)$ is a turbo inertia effect.

8. The method of claim 1, wherein determining a boost control command for the air charging system comprises:
determining a desired compressor power, an exhaust energy flow into a turbine, and a turbo inertia based on the monitored operating parameters of the air charging system;
determining a boost pressure error between the reference boost pressure and an actual boost pressure;
applying feedback control methods to the boost pressure error to determine a feedback control signal;
determining a turbine power transfer rate based on the desired compressor power, the energy flow into a turbine, the turbo inertia and the feedback control signal; and
converting the turbine power transfer rate into the boost control command for the air charging system.

9. The method of claim 8, wherein applying feedback control methods to the boost pressure error to determine a feedback control signal comprises using a proportional-integral-derivative feedback control.

10. The method of claim 8, wherein applying feedback control methods to the boost pressure error to determine a feedback control signal comprises using a model predictive feedback control.

11. The method of claim 8, wherein applying feedback control methods to the boost pressure error to determine a feedback control signal comprises using a linear quadratic regulator feedback control.

12. The method of claim 1, wherein determining a boost control command for the air charging system comprises:
determining a desired compressor power, an exhaust energy flow into a turbine, and a turbo inertia based on the monitored operating parameters of the air charging system;
determining a feedforward control signal based on the desired compressor power, the exhaust energy flow into the turbine, and the turbo inertia;
determining a boost pressure error between the reference boost pressure and an actual boost pressure;
applying feedback control methods to the boost pressure error to determine a feedback control signal; and
determining a boost control command for the air charging system based on the feedforward control signal and the feedback control signal.

13. The method of claim 12, wherein applying feedback control methods to the boost pressure error to determine a feedback control signal comprises using a proportional-integral-derivative feedback control.

14. The method of claim 12, wherein applying feedback control methods to the boost pressure error to determine a feedback control signal comprises using a model predictive feedback control.

15. The method of claim 12, wherein applying feedback control methods to the boost pressure error to determine a feedback control signal comprises using a linear quadratic regulator feedback control.

16. Method to control boost air in an air charging system in an internal combustion engine, the method comprising:
providing a turbocharger energy balance model of the air charging system;
applying feedback linearization control to the turbocharger energy balance model to create an approximately linearized feedback system;
determining a boost control command required to achieve a desired boost pressure in the air charging system using the approximately linearized feedback system; and
controlling the boost air in the air charging system based upon the boost control command.

17. The method of claim 16, wherein said turbocharger energy balance model of the air charging system is expressed by the following relationship:

$$\dot{P}_{rc} = -c^* h_c r_c (p_{rc}, Q_c) + c^* h_t r_t$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine, and
$r_t$ is a turbine power transfer rate.

18. The method of claim 16, wherein said turbocharger energy balance model of the air charging system is expressed by the following relationship:

$$\dot{P}_{rc} = -c^* h_c r_c (p_{rc}, Q_c) + c^* h_t r_t + J(\dot{Q}_c, Q_c)$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine,
$r_t$ is a turbine power transfer rate, and
$J(\dot{Q}_c, Q_c)$ is a turbo inertia effect.

19. The method of claim 16, wherein applying feedback linearization control to the turbocharger energy balance model to create an approximately linearized feedback system is expressed by the following relationship:

$$r_t = \frac{1}{h_t}\left(h_c r_c(p_{rc}, Q_c) - \frac{1}{c}J(\dot{Q}_c, Q_c) + \frac{1}{c}v\right)$$

wherein $p_{rc}$ is a compressor pressure ratio,
c is a constant determined based on the relationship between the compressor pressure ratio and the square of the turbo speed,
$h_c$ is a fresh air energy flow into a compressor,
$r_c$ is a compressor power increase rate,
$Q_c$ is a corrected compressor flow,
$h_t$ is an exhaust energy flow into a turbine,
$r_t$ is a turbine power transfer rate,
v is a feedback control signal based on a feedback control method, and
$J(\dot{Q}_c, Q_c)$ is a turbo inertia effect.

20. Method to control boost air in an air charging system in an internal combustion engine, the method comprising:
monitoring a reference boost pressure;
monitoring operating parameters of the air charging system;
providing a turbocharger energy balance model of the air charging system;
applying feedback linearization control to the turbocharger energy balance model to create an approximately linearized feedback system, comprising:

determining a feedforward control signal based on the monitored reference boost pressure and the monitored operating parameters of the air charging system; and determining a feedback control signal based on the monitored reference boost pressure and the monitored operating parameters of the air charging system;

determining a boost control command for the air charging system based on the feedforward control signal and the feedback control signal of the approximately linearized feedback system; and controlling the boost air in the air charging system based upon the boost control command.

\* \* \* \* \*